United States Patent Office 3,155,337
Patented Nov. 3, 1964

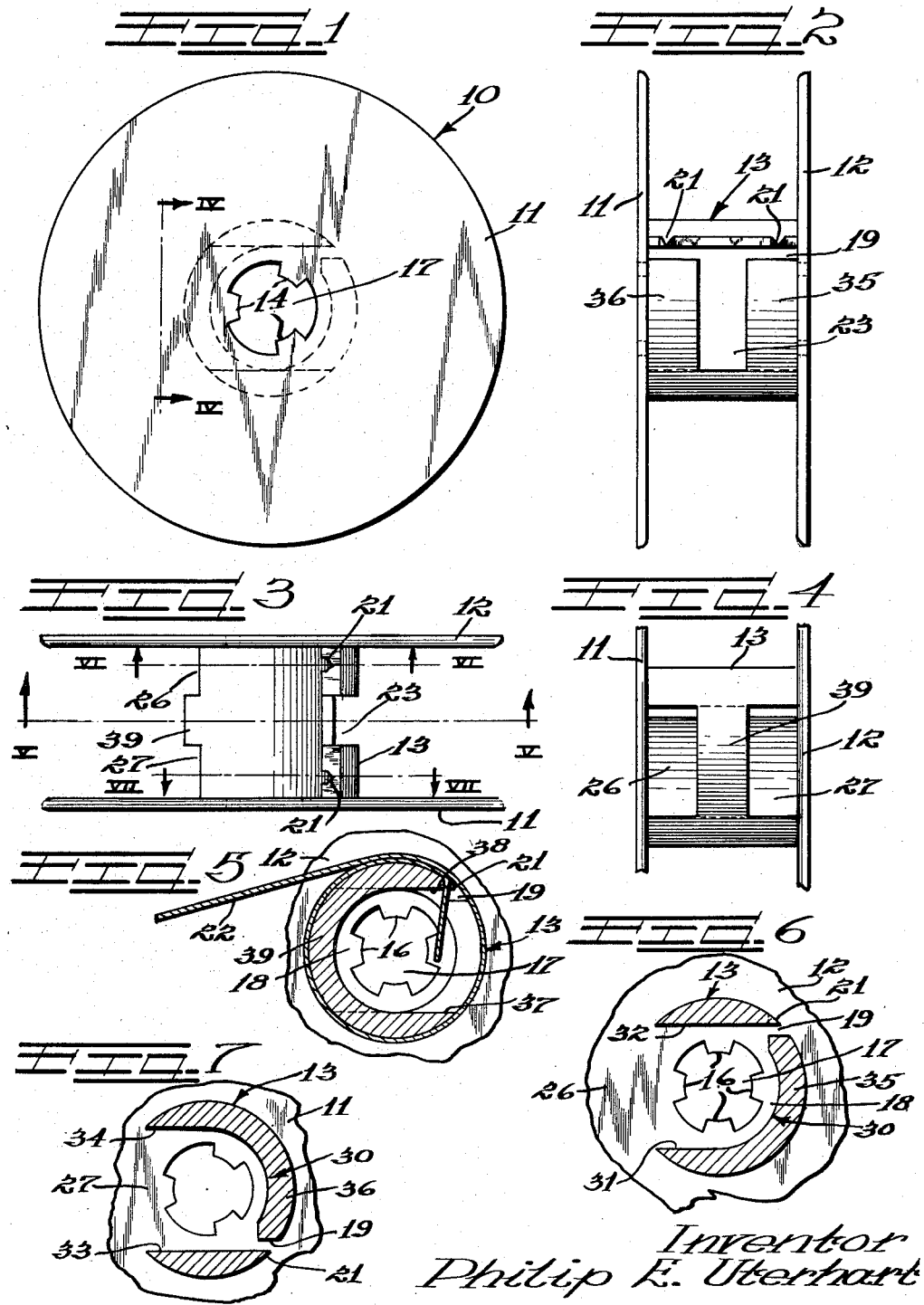

3,155,337
CAMERA FILM SPOOL
Philip E. Uterhart, Park Ridge, Ill., assignor to Bell and Howell Company, Chicago, Ill., a corporation of Illinois
Filed Mar. 25, 1963, Ser. No. 267,690
5 Claims. (Cl. 242—74)

The present invention relates to an improved spool for motion picture film and the like having means for securely engaging the end of the film onto the hub of the spool.

Various spool designs are presently employed for motion picture cameras, all with some provision for anchoring the end of the film to the hub of the spool. However, most such previously designed devices included a plurality of slots through the hub, some of which are invariably diametrically opposed to others. With this condition, it is possible to thread the film through the hub and have it extend across the center of the hub, thereby interfering with the insertion of the spool over the spindle of the camera.

An object of the present invention is to provide an improved single slot spool for motion picture cameras, the spool including a positive locking means for the motion picture film carried thereon.

Another object of the present invention is to provide a spool for motion picture cameras which locks the end of the film into a position in which it cannot interfere with the insertion or withdrawal of the spool from the spindle.

A further object of the invention is to provide an improved spool design for motion picture cameras which can be fabricated considerably more cheaply than spools heretofore employed for this purpose.

Another object of the invention is to provide an improved spool assembly for motion picture cameras which makes it possible to mold the spool out of plastic material in a single operation.

In accordance with the present invention, an improved single slot spool is provided for motion picture film, the spool including a pair of spaced flanges, and a hub disposed between the flanges. The hub has a hollow interior of sufficient dimension to provide an aperture therethrough which receives the spindle of the motion picture camera and leaves a space about the spindle at the aperture sufficient to accommodate a thickness of film between the spindle and the inner wall of the hub. The interior of the hub thus provides continuous film guiding surfaces for the film spaced from the axial center of the hub. The hub is further provided with a non-radially extending slot in the wall thereof which is arranged to direct a piece of film along the film guiding surfaces of the hub rather than across the aperture. Film retaining means such as a pair of spaced teeth integrally formed in the hub are located at the entrance of the slot to provide for anchoring the end portion of the film releasably to the hub.

Basically the spool which is constructed in accordance with my invention comprises a generally cylindrical hub and a pair of flanges formed integrally therewith at opposed ends of the hub. In the embodiment of my invention illustrated in the appended drawings, the hub comprises a pair of hub-wall portions which extend between the spaced flanges and a plurality of bands which extend in a circumferential direction from the hub-wall portions to define a cylindrical surface upon which film can be wrapped. It will be observed that slots are formed within the hub at points diametrically opposite the hub slots and that these slots are complementary with the bands in the sense that they describe equal arcs. As a result of this formation a core can be inserted through each of the slots to form the inner surface of the bands positioned opposite each of the slots.

A further description of the present invention will be made in conjunction with the attached sheet of drawings which illustrates a preferred embodiment.

In the drawings:

FIGURE 1 is a plan view of a camera spool assembly constructed according to the present invention;

FIGURE 2 is an end elevation view of the spool of FIGURE 1;

FIGURE 3 is a side elevation view of the spool;

FIGURE 4 is a fragmentary view in elevation of the hub assembly illustrating the slot configuration used therein;

FIGURE 5 is a cross-sectional view taken along the line V—V of FIGURE 3 and illustrating the manner in which the end of a piece of motion picture film is wound up on the hub;

FIGURE 6 is a cross-sectional view taken along the line VI—VI of FIGURE 3; and

FIGURE 7 is a cross-sectional view taken along the line VII—VII of FIGURE 3.

As shown in the drawings:

In FIGURES 1 and 2, reference numeral 10 indicates generally a spool construction according to the present invention including a pair of flanges 11 and 12 and a centrally disposed hub 13 joining the flanges 11 and 12. In keeping with conventional practice, the flange 11 is provided with a set of three oppositely disposed lugs 14 and the flange 12 is provided with four opposed lugs 16 shown in FIGURE 5, to orient the spool properly when employed in conventional eight millimeter film cameras.

In accordance with the present invention, the hub 13 is designed to accommodate the end of a piece of motion picture film and to lock it on the hub in an out of the way position with respect to the spindle received through the spindle aperture 17. As best seen in FIGURES 5 and 6, the inner diameter of the hollow hub 13 is sufficient to accommodate not only the spindle extending through the spindle aperture 17 but also leaving a space generally indicated at numeral 18 sufficiently wide to accommodate a thickness of the film. The film is introduced into this space 18 by providing a non-radial slot 19 through the wall of the hub 13, the slot extending the full distance between the flanges 11 and 12. The slot 19 is located in a plane perpendicular to the planes of the flanges 11 and 12. Thus, when the end of a film is introduced through the slot 19, it introduces the film substantially tangentially with respect to the inner diameter of the hub 13 so that the film follows the contour of the inner wall of the hub. The slot entrance may also be provided with film engaging means such as a pair of opposed teeth 21 arranged to engage the sprocket holes within the film 22 and lock the film end in position.

As best seen in FIGURE 2, the slot 19 merges with a slot 23 extending along the periphery of the hub 13 for about one quarter of the periphery. An additional pair of peripheral slots 26 and 27 are formed on the opposite side of the hub 13 and also extend approximately one quarter of the circumference of the hub. It should be borne in mind that the term "peripheral slot" is employed herein to designate a slot which is formed in the hub in a circumferential direction about a portion of the surface of revolution of the main body of the hub itself. The peripheral slots 23, 26 and 27 are added to facilitate molding procedures and die design so that the hub may be made of a one-piece molding from a suitable plastic material.

To more clearly explain the molding technique required to mold the instant spool, it will be assumed that one spool has been formed and the cores are merely being re-inserted in that spool to demonstrate what has been accomplished. The hub configurations shown in FIGURES 5, 6, and 7 are of particular interest in this explanation. Specifically, a first molding core (the width of slot 26) enters slot 26 and protrudes rearwardly between flat portions 31 and 32 (see FIGURE 6) on the inner wall 30, until the core comes against the inner surface of hub portion 35 (see FIGURES 2 and 6). A small tip of this first molding core extends through slot 19 to the outer surface of hub 13.

Similarly, a second molding core (width of slot 27) enters slot 27 and protrudes rearwardly between flat portions 33 and 34 (see FIGURE 7) of the inner wall 30 until the core comes against the inner surface of hub portion 36 (see FIGURES 2 and 7). A small tip of this second molding core extends through slot 19 to the outer surface of hub 13. Notice that the inner surface of slot 19 and flat portions 31 and 32 are all parallel to the direction of movement of the first molding core, and the inner surface of slot 19 and flat portions 33 and 34 are all parallel to the direction of movement of the second molding core, so that these cores may be freely removed after molding.

A third molding core (the width of slot 23) enters slot 23 and protrudes rearwardly between flat portions 37 and 38 (see FIGURE 5) of the inner wall 30 until the core comes against the inner surface of hub portion 39 (see FIGURES 3, 4 and 5). Thus it is observed that the first and second cores are parallel to each other and enter hub 13 from one direction. The third molding core enters hub 13 from the opposite direction as the first and second cores.

From the foregoing, it will be appreciated that the spool of the present invention provides a simple and inexpensive means for securing film in a motion picture camera. It should also be evident that various modifications can be made to the described embodiments without departing from the scope of the present invention.

I claim as my invention:

1. An integral spool for motion picture film comprising a hollow hub having flanges centrally mounted at opposed ends thereof, said hub having at least one hub wall portion extending between said flanges and a plurality of circumferentially extending bands forming extensions of said at least one hub wall portion, wherein slots complementary to said bands are formed within said hub at points diametrically opposed to each of said bands, a non-radial slot formed along an edge of said hub wall portion intermediate said hub wall portion and an adjacent free end of at least one of said bands, and film gripping tooth means formed on said hub wall portion for retaining a strip of film within said slot.

2. A single slot spool for motion picture film comprising a pair of spaced flanges, a hub disposed between said flanges, said hub having a hollow interior of sufficient dimensions to provide an axial spindle aperture therethrough and leave a space about said spindle aperture sufficient to accommodate a thickness of film between a spindle in said aperture and the inner wall of said hub, said hub having at least one hub wall portion extending between said flanges and a plurality of circumferentially extending bands forming extensions of said at least one hub wall portion, wherein slots complementary to said bands are formed within said hub at points diametrically opposed to each of said bands said hub having a non-radial slot in the wall thereof, film retaining tooth means integrally formed in said hub at the entrance to said slot, the face of said film retaining tooth means being formed at an angle to a radious of said hub, and said entrance to said slot being formed at said same angle, whereby, said film passes in a substantially uninterrupted path across said film retaining tooth means, against said entrance to said slot, and against the inner surface of said hub, without protruding into said axial spindle aperture.

3. A single slot spool for motion picture film said spool integrally molded of one piece material and comprising a pair of flanges, a hub integrally molded between said flanges, said hub having a spindle receiving aperture extending axially therethrough, said hub having a non-radial slot in the wall thereof, and film retaining tooth means integrally molded in said hub at the entrance to said slot, said hub having a first peripheral slot, one end of which joins said non-radial slot, and a pair of peripheral slots diametrically opposite to and axially spaced from said first peripheral slot, each of said pair lying adjacent one of said spaced flanges, whereby said peripheral slots facilitate molding said spool in one piece.

4. An integral spool for motion picture film comprising a hollow hub having flanges centrally mounted at opposed ends thereof, said hub having at least one hub wall portion extending between said flanges and a plurality of circumferentially extending bands forming extensions of said hub wall portion, wherein slots complementary to said bands are formed within said hub at points diametrically opposed to each of said bands and wherein at least one of said plurality of bands is positioned on the opposite side of said hub from at least one other of said plurality of bands, at least one of said bands having an axially extending slot therein to permit film to enter said hollow hub, and tooth means integrally formed in said hub adjacent said axially extending slot for retaining a strip of film within said slot.

5. The film spool of claim 4 wherein said hub wall portion and said bands define inner and outer peripheral surfaces, the inner peripheral surface adjacent one side of said axially extending slot being substantially flat so as to permit film entering said slot to normally lie against said flat surface.

References Cited by the Examiner

UNITED STATES PATENTS

| | | | |
|---|---|---|---|
| 1,871,234 | 8/32 | Proctor | 242—74 |
| 3,092,348 | 6/63 | Corsan | 242—74 |
| 3,124,320 | 3/64 | Brennesholtz | 242—71.8 |

FOREIGN PATENTS 1,207,281  8/59  France.

JORDAN FRANKLIN, *Primary Examiner.*